United States Patent [19]
Johnson

[11] Patent Number: 5,688,027
[45] Date of Patent: Nov. 18, 1997

[54] CONTROL VALVE LOCK FOR A VEHICLE AIR BRAKE SYSTEM

[75] Inventor: James J. Johnson, 365 Blvd. Deguire, Apt. 801, St. Laurent, Quebec, Canada, H4N 2T8

[73] Assignee: James J. Johnson, St. Laurent, Canada

[21] Appl. No.: 678,324

[22] Filed: Jul. 11, 1996

[51] Int. Cl.[6] .................................................. B60T 17/16
[52] U.S. Cl. .................................................. 303/89; 188/353
[58] Field of Search .............................. 303/89; 188/285, 188/353; 180/287

[56] References Cited

U.S. PATENT DOCUMENTS

| | | | |
|---|---|---|---|
| 3,625,573 | 12/1971 | Conn | 303/89 |
| 3,998,495 | 12/1976 | Maxwell et al. | 303/89 |
| 4,040,675 | 8/1977 | Richmond et al. | 303/89 |
| 4,881,615 | 11/1989 | Conway | 188/353 |

Primary Examiner—Matthew C. Graham
Attorney, Agent, or Firm—Swabey Ogilvy Renault; Guy J. Houle

[57] ABSTRACT

A control valve lock for a vehicle air brake system is described whereby to secure the parking brakes of the vehicle in an engaged locked position. The lock is securable to the valve actuating rod on the dashboard control valve and is comprised essentially of a block-like base member to which is secured a large actuating knob. A lock cylinder extends through a portion of the knob and the base member and aligns internal locking cavities between the connecting shaft of the knob and the base member whereby the locking dog of the lock cylinder can engage in the cavities to secure the knob in a retracted position whereby to lock the brakes of the vehicle. In order to unlock the brakes, it is necessary to insert a key in the key cylinder to liberate the knob to permit it to be pushed inwardly whereby the dashboard control valve can supply air to the parking brake cylinder to release the brakes.

10 Claims, 3 Drawing Sheets

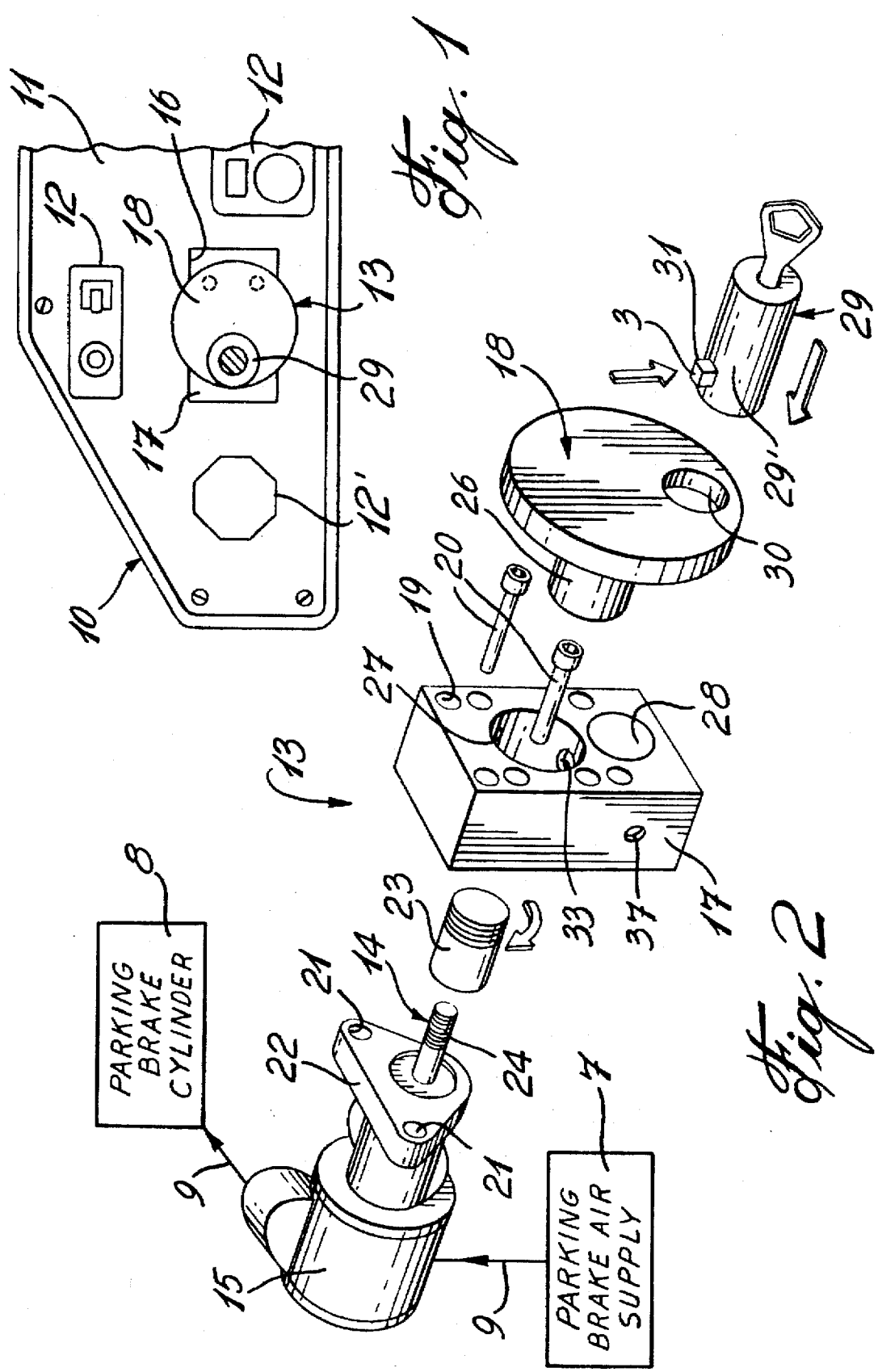

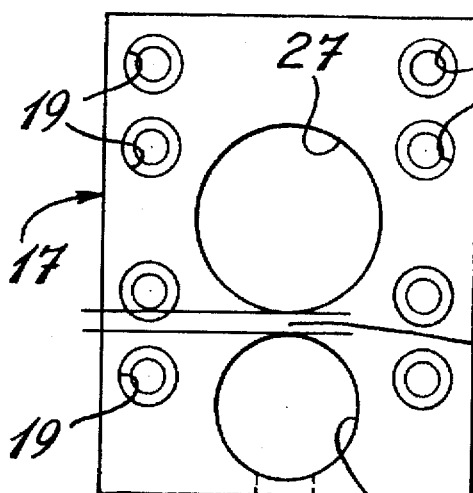
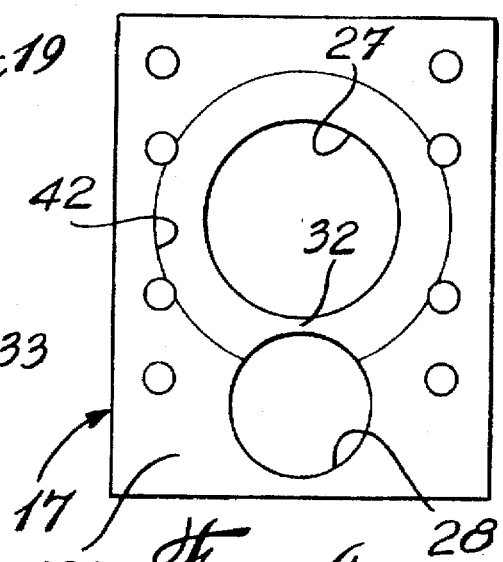
Fig. 3    Fig. 4
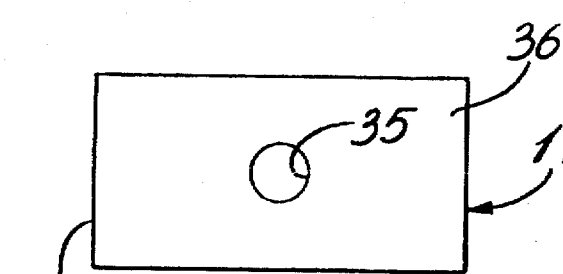
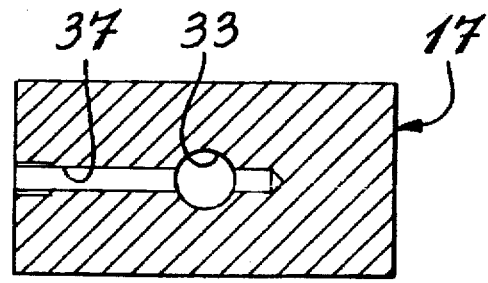
Fig. 5    Fig. 6
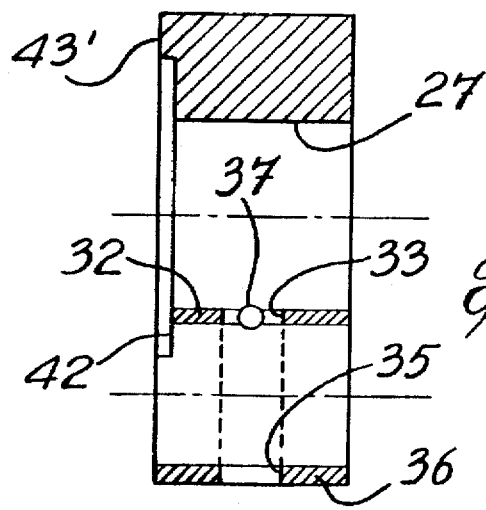
Fig. 7

CONTROL VALVE LOCK FOR A VEHICLE AIR BRAKE SYSTEM

TECHNICAL FIELD

The present invention relates to a control valve lock for a vehicle air brake system whereby to secure the parking brakes of the vehicle in an engaged locked position.

BACKGROUND ART

Various systems have been provided whereby to prevent theft of tractor-trailer vehicles, or other type vehicles using air brakes, by preventing the disengagement of the air brakes. In U.S. Pat. No. 3,998,495, issued on Dec. 21, 1976, there is disclosed a lock incorporated in a control valve which enables a person in possession of a key to lock the dashboard control valve in a brake actuated position. The lock is integrated with the locking dashboard control valve through which air pressure is supplied to the spring set parking brake cylinder. By pulling the valving rod of the valve air is exhausted from the parking brake cylinder to enable the brakes. The brakes can therefore only be freed by inserting a key into the lock and pushing the valving rod 18 into the valve so that air pressure can then be fed to the parking brake cylinders. A disadvantage of this design is that it is expensive and the installation also requires that the dashboard control valve fitted with the lock be installed as a complete unit. This requires substantial modifications to the dashboard of the vehicle and this is labour intensive. Another disadvantage is that the cylinder can be tampered with by removing the dashboard trim plate and bypassing the control valve. With this system you either need a new control valve or modify the existing valve and this could affect the integrity of the braking system.

SUMMARY OF INVENTION

It is a feature of the present invention to provide a control valve lock for a vehicle air brake system which substantially overcomes the above-mentioned disadvantages of the prior art.

Another feature of the present invention is to provide a control valve lock for a vehicle air brake system which may be supplied in kit form and which is easy to install from outside the dashboard trim plate without removing the dashboard control valve or in any way modifying this valve.

Another feature of the present invention is to provide a control valve lock for a vehicle air brake system which is securable to the valve actuating rod and which may be adapted to rods of different lengths or diameters.

Another feature of the present invention is to provide a control valve lock for a vehicle air brake system and wherein the knob which is connected to the valve actuating rod prevents the dashboard trim plate from being removed for access to the dashboard control valve.

Another feature of the present invention is to provide a control valve lock for a vehicle air brake system and wherein the lock cylinder may be easily removed from the valve lock without dismantling the valve lock.

Another feature of the present invention is to provide a control valve lock which is securable to the valve actuating rod of the dashboard control valve without disturbing the integrity of the parking brake system and without tapping the air supply lines of the system and which can be adapted to different dashboard control valves.

According to the above features, from a broad aspect, the present invention provides a control valve lock for a vehicle air brake system to secure air-operated parking brakes in an engaged locked position. The lock comprises a base member having means to secure same relative to a valve actuating rod of an air control valve of the air brake system. The base member has a first bore for receiving in sliding fit therein a connecting shaft of an actuating knob. Means is provided to secure the connecting shaft to the valve actuating rod. A second bore is provided in the base member and spaced adjacent the first bore for receiving in sliding fit therein a portion of a lock cylinder. A passage is provided in the knob and disposed for axial alignment with the second bore and permits free passage of the lock cylinder therethrough and in close sliding fit with at least a portion of the lock cylinder. The base member has a web section between the first and second bore. A locking through bore is provided in the web. A key operable locking dog, having a locking end portion, is spring-biased to extend out of a side wall of the lock cylinder and into the locking through bore. A dog engaging bore is provided in the connecting shaft of the actuating knob. The locking end portion of the locking dog extends into the dog engaging bore when the knob is in a retracted position to enable the parking brakes. The dog is retractable in the lock cylinder by a key whereby to retract the locking end portion of the dog to disconnect the knob to permit the parking brakes to be disabled.

BRIEF DESCRIPTION OF DRAWINGS

A preferred embodiment of the present invention will now be described with reference to the accompanying drawings in which:

FIG. 1 is a plan view of a dashboard trim plate on which has been mounted the control valve lock of the present invention;

FIG. 2 is an exploded perspective view showing the construction of the control valve lock and its securement to the control valve mounted behind the dashboard trim plate of FIG. 1;

FIG. 3 is a front view of the base member;

FIG. 4 is a rear view of the base member;

FIG. 5 is a bottom view of FIG. 3;

FIG. 6 is a section view showing the position of the tool inserting passage relative to the locking through bore in the web;

FIG. 7 is a side section view extending across the central transverse plane of the base member;

DESCRIPTION OF PREFERRED EMBODIMENTS

Figure 10:
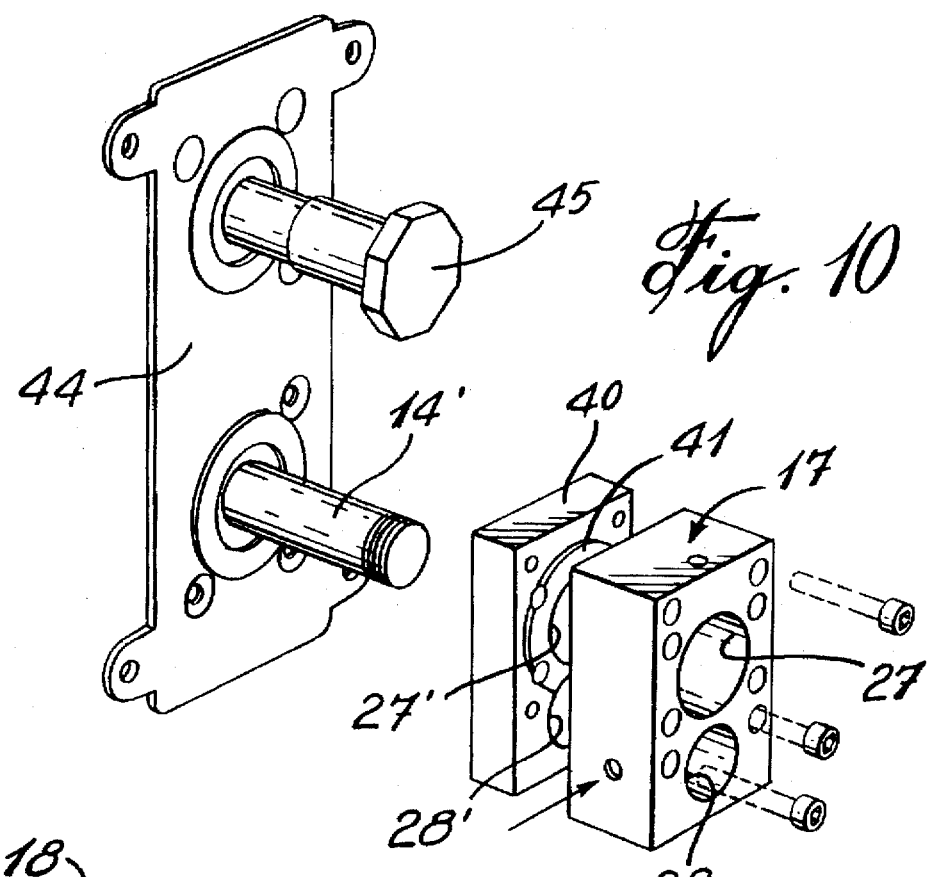
FIG. 10 is an exploded view showing the base member provided with a spacer block.

Referring now to the drawings, and more particularly to FIG. 1, there is shown a portion of a dashboard 10 of a tractor-trailer which on which there is secured a decorative trim plate 11. Various instruments and controls 12 are secured to the dashboard and extend out of the trim plate, as hereinshown. The control valve lock 13 of the present invention is secured to the valve actuating rod 14, as shown in FIG. 2, of the dashboard control valve 15 which extends through the dashboard trim plate 11. A knob similar to that as shown at 12' is usually secured to the valve actuating rod and it is removed to permit the connection of a control valve lock 13 thereto. In order to secure the control valve lock 13 of the present invention thereto, it is preferable to cut out the trim plate 11 to form an aperture 16 to receive the base member 17, as shown in FIG. 2, of the control valve lock. As hereinshown the knob 18 of the control valve lock has a diameter which is substantially greater than the width of the aperture 16 and therefore prevents the decorative trim plate 11 from being removed thereby precluding access to the dashboard control valve 15 which is secured behind the dashboard.

The dashboard control valve 15 is connected in the air supply line 9 which supplies the parking brake cylinders 8 from a pressurized air supply 7.

As shown in FIG. 2, the control valve lock 13 consists of a base member 17 provided with fastener receiving holes 19 through which bolts 20 protrude to connect to threaded bores 21 provided in the mounting bracket 22 of the dashboard control valve 15 and which is secured to the dashboard 10 behind the trim plate 11. As hereinshown, an adapter rod 23 is threadedly secured to the threaded free end 24 of the valve actuating rod 14 to adapt that rod to the threaded bore 25 (see FIG. 8), formed in the connecting shaft 26 of the actuating knob 18. Of course, this threaded connection between the connecting shaft and the valve actuating rod may be achieved by other coupling means.

The base member 17 is provided with a first through bore 27 which is hereinshown as being of circular cross-section for receiving in sliding fit therein the connecting shaft 26 of the actuating knob 18. A second through bore 28 is provided in the base member and spaced adjacent the first through bore 27 for receiving in sliding fit therein a rear portion of the cylindrical lock cylinder 29. The lock cylinder 29 also extends through a passage in the knob 18 and as hereinshown this passage is also of circular cross-section but it could also be of U-shape, as shown by phantom lines 30' in FIG. 9, whereby at least a portion of the lock cylinder can be arrested to perform its aligning function as will be described later. In order to insert the lock cylinder 29 into the cylindrical mounting hole 30, it is necessary to depress the spring-actuated locking dog 31 into the side wall 29' of the lock cylinder 29 and to then insert the cylinder and the retracted dog within the cylindrical mounting hole 30 and its aligned bore 28 formed in the base member 17.

Referring now additionally to FIGS. 3 to 7, it can be seen that the base member 17 is provided with a plurality of the fastener receiving holes 19 whereby to adapt it to different types of mounting plates 22 of the dashboard control valve 15 depending on the type of control valve supplied with the vehicle. The spacing between the first through bore 27 and the second through bore 28 defines a web 32 therebetween. As shown in FIG. 7 the web is also provided with a locking through bore 33 substantially at the center thereof. This locking through bore 33 is provided to permit passage therethrough of the locking dog 31 of the lock cylinder 29 when the lock 13 is assembled.

Figure 8:
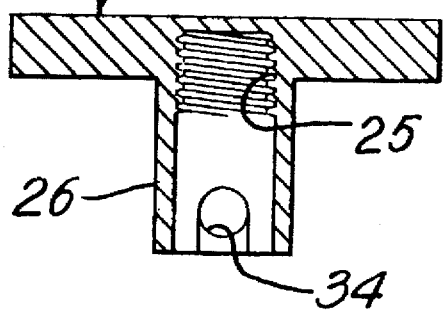
FIG. 8 is a section view of the actuating knob.
Figure 9:
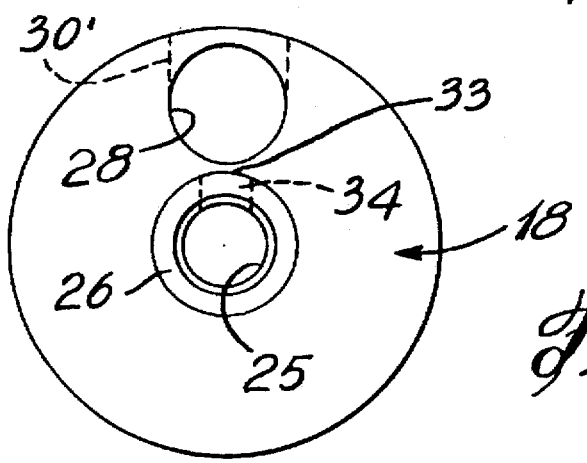
FIG. 9 is a rear view of the knob.

With additional reference to FIGS. 8 and 9, it can be seen that the connecting shaft 26 of the actuating knob 18 is a hollow shaft and it is further provided with a dog engaging bore 34 which is dimensioned to receive the locking dog 31 therein whereby to engage the actuating knob 18 in a retracted position, as will be described later.

In assembling the control valve lock 13 of the present invention it is essential that the dog engaging bore 34 in the connecting shaft be aligned with the through bore 33 in the web 32 and in order to do so, because these bores are not visually accessible, this is done by the lock cylinder 29 which aligns both the through bore 30 with the second through bore 28 in the base member 17. In this position, both the dog engaging locking hole 34 and the through bore 33 are perfectly aligned to receive the locking dog 31. The bore 35 provided in the bottom wall 36 of the base member 17 is formed when drilling the through bore 33 in the web 32 and has no other purpose. A plug may be fitted in this bore. It can be seen from FIG. 9 that the passage 30' may be a U-shaped passage with the curved portion of the U being disposed and in alignment with the center of the circular knob 18 and this permits the above-described alignment. The U-shaped portion would be of substantially identical curved shape as the cross-section curve of the second through bore 28.

As previously described, the knob 18 is formed as a large circular disc disposed transverse at the free outer end of the connecting shaft 26 and is dimensioned to exceed the width of the base member 17.

Referring now more specifically to FIGS. 6 and 7, there is shown a tool inserting passage 37 extending in the base member from a side wall 38 thereof and it is aligned with and extends to the locking through bore 33 whereby to permit the insertion of a tool, herein a small screwdriver having a flat end, whereby to apply a pushing force on the free end 31' of the dog 31 to push it into the cylinder whereby to permit the cylinder to be retracted from the second bore to change the lock cylinder or remove the lock 13. If the passage 30 is open at the bottom end, as shown at 30', the cylinder can then be removed by simply pulling it out of the second through bore 28 and then withdrawing it through the open end of the passage 30. If the passage 30 is a circular through bore, as shown in FIG. 2, the locking dog can then be pushed in by retracting the knob 18 to provide access to the locking dog which is then pushed in again and the cylinder drawn out of the through bore 30. Accordingly, a cylinder can be easily interchanged or removed to disassemble the lock assembly.

The base member 17 as hereinshown, is a rectangular metal block. The knob 18 is also formed of metal to provide added security. Because the valve actuating rods 14, of different control valves 15, are different, as shown in FIG. 10, wherein rod 14' is longer and of larger diameter, there is provided a spacer block 40 which is also formed of metal and provides the thickness of the base member 17 to be adjusted. The spacer block 40 is also provided with a first and second bore 27' and 28' which are of substantially the same diameter as the bores 27 and 28 and are aligned in juxtaposition therewith by a projecting circumferential flange 41 which fits into a circumferential cavity 42 disposed about the first through bore 27 in the rear face 43 of the block member 17. FIG. 10 also shows a mounting plate 44 which secures the dashboard control valve 15 to the dashboard of the vehicle cab. An air supply valve 45 also extends from the mounting plate 44.

It is within the ambit of the present invention to cover any obvious modifications of the preferred embodiment described herein, provided such modifications fall within the scope of the appended claims.

I claim:

1. A control valve lock for a vehicle air brake system to secure air-operated parking brakes in an engaged locked position, said lock comprising a base member having means to secure said base member relative to a valve actuating rod of an air control valve of said air brake system, said base member having a first bore for receiving in sliding fit therein a connecting shaft of an actuating knob, means to secure said connecting shaft to said valve actuating rod, a second bore in said base member spaced adjacent said first bore for receiving in sliding fit therein a portion of a lock cylinder, a passage in said knob disposed for axial alignment with said second bore and permitting free passage of said lock cylinder therethrough and in close sliding fit with at least a portion of said lock cylinder, said base member having a web section between said first and second bore, a locking through bore in said web, a key operable locking dog having a locking end portion spring-biased to extend out of a side wall of said lock cylinder and into said locking through bore, a dog engaging bore in said connecting shaft of said actuating knob, said locking end portion of said locking dog extending into said dog engaging bore when said knob is in a retracted position to enable said parking brakes, said dog being retractable in said lock cylinder by a key whereby to retract said locking end portion of said dog to disconnect said knob to permit said parking brakes to be disabled.

2. A control valve lock as claimed in claim 1 wherein said passage in said knob and said second bore are of substantially identical circular cross-section to receive said lock cylinder in close sliding fit therein.

3. A control valve lock as claimed in claim 2 wherein said second bore is positioned in an enlarged disc disposed transverse at a free outer end of said valve actuating rod of said actuating knob, said second bore being aligned with said dog engaging bore in said connecting shaft, said lock cylinder maintaining said dog engaging bore aligned with said locking through bore of said web.

4. A control valve lock as claimed in claim 3 wherein there is further provided a tool inserting passage in said base member and aligned with and extending to a side of said locking through bore to permit the insertion of a tool capable of applying a pushing force on a free end of said dog to push it into said cylinder to permit said cylinder to be retracted from said second bore.

5. A control valve lock as claimed in claim 3 wherein said means to secure said connecting shaft to said valve actuating rod is comprised by a threaded connection between said connecting shaft and said valve actuating rod.

6. A control valve lock as claimed in claim 5 wherein said threaded connection is provided by an adapter rod secured in alignment with a free end of said valve actuating rod, said adapter rod having a threaded outer end for threaded axial connection in a bore of said connecting shaft.

7. A control valve lock as claimed in claim 3 wherein said base member is a rectangular metal block, there being further provided a spacer block which is connectable in juxtaposition against a rear face of said base member to adjust the thickness of said base member to adapt it to valve actuating rods of different lengths, said spacer block having a first and second bore of like cross-section to said first and second bore of said base member.

8. A control valve lock as claimed in claim 7 wherein means to secure said base member is constituted by two or more bolts extending from a front face of said rectangular metal block, said bolts being disposed behind said enlarged disc.

9. A control valve lock as claimed in claim 7 wherein said enlarged disc is a circular metal disc having a diameter which is greater than the width of said rectangular metal block whereby to prevent the removal of a dashboard trim plate of a tractor-trailer type vehicle.

10. A control valve lock as claimed in claim 3 wherein said lock cylinder is an "Abloy" lock cylinder having a cylindrical housing with a key hole at an outer end thereof.

* * * * *